(12) United States Patent
Garrett et al.

(10) Patent No.: US 11,784,481 B2
(45) Date of Patent: Oct. 10, 2023

(54) SUBMARINE CABLE ARCHITECTURE WITH REDUNDANCY FOR FACILITATING SHARED LANDING SITE

(71) Applicant: SUBCOM, LLC, Eatontown, NJ (US)

(72) Inventors: Lara Denise Garrett, Red Bank, NJ (US); Georg Heinrich Mohs, East Brunswick, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 208 days.

(21) Appl. No.: 17/087,472

(22) Filed: Nov. 2, 2020

(65) Prior Publication Data

US 2021/0175699 A1   Jun. 10, 2021

Related U.S. Application Data

(60) Provisional application No. 62/943,600, filed on Dec. 4, 2019.

(51) Int. Cl.
| H02G 15/14 | (2006.01) |
| G02B 6/44 | (2006.01) |
| G02B 6/50 | (2006.01) |
| H01R 4/66 | (2006.01) |
| H02G 1/10 | (2006.01) |

(52) U.S. Cl.
CPC .......... *H02G 15/14* (2013.01); *G02B 6/4427* (2013.01); *G02B 6/506* (2013.01); *H01R 4/66* (2013.01); *H02G 1/10* (2013.01)

(58) Field of Classification Search
CPC ........ H02G 15/14; H02G 1/10; G02B 6/4427; G02B 6/506; H01R 4/66; H04B 10/03; H04B 10/25; H04B 10/27; H04B 10/038
See application file for complete search history.

(56) References Cited

U.S. PATENT DOCUMENTS

| 6,414,405 | B1 | 7/2002 | Schesser et al. | |
| 6,922,530 | B1 * | 7/2005 | Kauffeldt | ............ H04J 14/0217 |
| | | | | 398/83 |
| 7,326,916 | B2 * | 2/2008 | Sugiyama | ............ H04B 10/032 |
| | | | | 250/227.24 |
| 8,750,707 | B2 * | 6/2014 | Sabet | ..................... H04L 63/083 |
| | | | | 380/263 |
| 9,544,086 | B2 * | 1/2017 | Inoue | ..................... H04B 10/03 |
| 10,110,321 | B2 * | 10/2018 | Muth | .................. H04J 14/0202 |
| 10,230,456 | B2 * | 3/2019 | Thomas | ............. H04J 14/0201 |

(Continued)

FOREIGN PATENT DOCUMENTS

EP            2860885 A1       4/2015

*Primary Examiner* — Andrew Jordan
(74) *Attorney, Agent, or Firm* — KDW FIRM PLLC (57) ABSTRACT

An undersea fiber optic cable architecture including a beach manhole (BMH) installed at a terrestrial site, a terrestrial station connected to the BMH by a terrestrial fiber optic cable, a first landing cable extending from the BMH into territorial waters adjacent the terrestrial site and connected to a first enhanced branching unit (EBU) located in the territorial waters, a second landing cable extending from the BMH into the territorial waters and connected to a second EBU located in the territorial waters, a recovery path cable connecting the first EBU to the second EBU, a first trunk cable extending from the first EBU into international waters, and a second trunk cable extending from the second EBU into the international waters.

15 Claims, 5 Drawing Sheets

(56) References Cited

U.S. PATENT DOCUMENTS

| | | | |
|---|---|---|---|
| 10,461,852 B1 * | 10/2019 | Grubb | H04B 10/07955 |
| 10,659,155 B2 * | 5/2020 | Grubb | H04B 10/07955 |
| 11,087,902 B2 * | 8/2021 | Garrett | H01B 9/005 |
| 11,347,004 B2 * | 5/2022 | Kardos | H04J 14/022 |
| 2007/0138417 A1 | 6/2007 | Sugiyama et al. | |
| 2012/0263476 A1 * | 10/2012 | Sabet | H04B 10/85 |
| | | | 398/104 |
| 2015/0295674 A1 * | 10/2015 | Inoue | H04J 14/0215 |
| | | | 398/83 |
| 2018/0083697 A1 * | 3/2018 | Thomas | H04B 10/032 |
| 2018/0269990 A1 * | 9/2018 | Muth | H04J 14/0202 |
| 2020/0052788 A1 * | 2/2020 | Grubb | H04B 10/07955 |
| 2020/0322055 A1 * | 10/2020 | Jones | H04B 10/29 |
| 2020/0400889 A1 * | 12/2020 | Kardos | G02B 6/29362 |
| 2020/0402685 A1 * | 12/2020 | Garrett | H02G 9/02 |
| 2021/0175699 A1 * | 6/2021 | Garrett | H02G 1/10 |
| 2021/0302660 A1 * | 9/2021 | Garrett | H04J 14/0267 |
| 2022/0252818 A1 * | 8/2022 | Yano | G02B 6/4472 |

\* cited by examiner

SUBMARINE CABLE ARCHITECTURE WITH REDUNDANCY FOR FACILITATING SHARED LANDING SITE

RELATED APPLICATIONS

This application claims priority to and the benefit of U.S. Provisional Application No. 62/943,600, entitled "SUBMARINE CABLE ARCHITECTURE WITH REDUDANCY FOR FACILITING SHARED LANDING SITE" filed on Dec. 4, 2019. The contents of the aforementioned application are incorporated by reference in its entirety.

FIELD OF THE DISCLOSURE

This disclosure relates generally to the field of undersea communication networks and relates more particularly to an architecture for implementing multiple undersea fiberoptic cables with redundant connections to a shared landing site.

BACKGROUND

Undersea fiber optic cables are commonly employed for transmitting data across expanses of ocean between terrestrial landing sites which are often located in different countries and on different continents. Implementing new undersea fiber optic cables generally necessitates the acquisition of government-issued cable landing licenses in order to own and operate undersea fiber optic cables and associated landing stations that must be installed at each terrestrial landing site and in adjoining territorial waters. The process for obtaining such cable landing licenses can be difficult, time-consuming, and expensive. It would therefore be advantageous to provide an undersea fiber optic cable architecture in which a plurality of cables can share a single terrestrial landing site. It would be a further advantage to provide such an architecture that facilitates the incorporation of additional cables (i.e., cables added after initial installation) using the same terrestrial landing site. It would be a further advantage to provide such an architecture that facilitates redundant routing of signal traffic between multiple cables and landing sites for enhancing the reliability of the architecture.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An undersea fiber optic cable architecture in accordance with an exemplary embodiment of the present disclosure may include a beach manhole (BMH) installed at a terrestrial site, a terrestrial station connected to the BMH by a terrestrial fiber optic cable, a first landing cable extending from the BMH into territorial waters adjacent the terrestrial site and connected to a first enhanced branching unit (EBU) located in the territorial waters, a second landing cable extending from the BMH into the territorial waters and connected to a second EBU located in the territorial waters, a recovery path cable connecting the first EBU to the second EBU, a first trunk cable extending from the first EBU into international waters, and a second trunk cable extending from the second EBU into the international waters.

An undersea fiber optic cable architecture in accordance with another exemplary embodiment of the present disclosure may include a first beach manhole (BMH) installed at a first terrestrial site, a second BMH installed at a first terrestrial site, a first landing cable extending from the first BMH into territorial waters adjacent the terrestrial site and connected to a first enhanced branching unit (EBU) located in the territorial waters, a second landing cable extending from the second BMH into the territorial waters and connected to a second EBU located in the territorial waters, a recovery path cable connecting the first EBU to the second EBU, a first trunk cable extending from the first EBU into international waters, and a second trunk cable extending from the second EBU into the international waters.

DETAILED DESCRIPTION

An undersea fiber optic cable architecture in accordance with the present disclosure will now be described more fully with reference to the accompanying drawing, in which a preferred embodiment of the undersea fiber optic cable architecture is presented. The undersea fiber optic cable architecture, however, may be embodied in many different forms and should not be construed as being limited to the embodiment set forth herein. Rather, this embodiment is provided so that this disclosure will convey certain exemplary aspects of the undersea fiber optic cable architecture to those skilled in the art.

Figure 1:
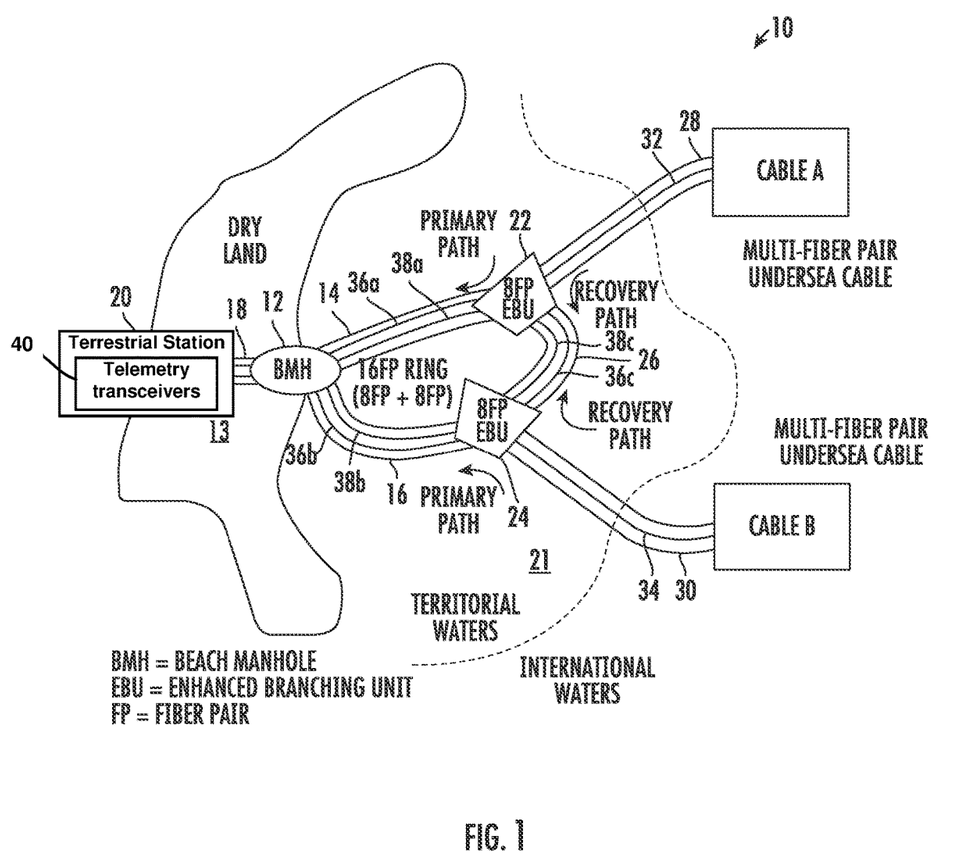
FIG. 1 is a schematic diagram illustrating an exemplary embodiment of an undersea fiber optic cable architecture in accordance with the present disclosure.

Referring to FIG. 1, an undersea fiber optic cable architecture 10 (hereinafter "the architecture 10") in accordance with an exemplary embodiment of the present disclosure is presented. The architecture 10 may include a beach manhole (BMH) 12 installed at a terrestrial site 13 (e.g., along a shoreline) for coupling undersea fiber optic cables 14, 16 to a terrestrial fiber optic cable 18. The terrestrial fiber optic cable 18 may extend to a terrestrial station 20 which may be configured to transmit and receive communication signals via the terrestrial fiber optic cable 18. The land-based elements of the architecture 10 (i.e., the beach manhole 12, the terrestrial fiber optic cable 18, and the terrestrial station 20) may be of conventional construction/configuration familiar to those of ordinary skill in the art and will therefore not be discussed in any greater detail herein.

The undersea fiber optic cables 14, 16 of the architecture 10, hereinafter referred to as "the first and second landing cables 14, 16," may extend from the BMH 12 into territorial waters 21 that adjoin the terrestrial site 13 and that are subject to the jurisdiction of an entity that owns/governs the terrestrial site 13. The first and second landing cables 14, 16 may extend to, and may be coupled to, respective first and second enhanced branching units (EBUs) 22, 24 that are located within the territorial waters 21 and that are connected to one another by an undersea fiber optic cable 26, hereinafter referred to as "the recovery path cable 26." Thus, the BMH 12, the first EBU 22, and the second EBU 24 are interconnected by the first and second landing cables 14, 16 and the recovery path cable 26 to define a ring topology.

Undersea fiber optic cables 28, 30, hereinafter referred to as "the first and second trunk cables 28, 30," may extend from the first and second EBUs 22, 24, respectively, and may extend into international waters for connecting the first and second EBUs 22, 24 to distant terrestrial stations (e.g., terrestrial stations located in different countries and on different continents, not shown). In a non-limiting embodiment of the present disclosure, the first and second trunk cables 28, 30 may each include a group of 8 bidirectional fiber pairs 32, 34, and each of the first and second landing cables 14, 16 and the recovery path cable 26 may include a first group of 8 bidirectional fiber pairs 36a, 36b, 36c, respectively, and a second group of 8 bidirectional fiber pairs 38a, 38b, 38c, respectively. Thus, the ring topology of the architecture 10 may include a total of 16 bidirectional fiber pairs. The present disclosure is not limited in this regard. It is contemplated that the first and second trunk cables 28, 30, the first and second landing cables 14, 16, and the recovery path cable 26 may include a greater or fewer number of fiber pairs without departing from the present disclosure.

Each of the first and second EBUs 22, 24 may contain optical switches for selectively routing individual fiber pairs in the respective trunk cables 28, 30 directly to the BMH 12 through the first and second landing cables 14, 16, respectively, or through the recovery path cable 26. For example, during normal operation of the architecture 10, the first EBU 22 may route incoming signal traffic from the bidirectional fiber pairs 32 of the first trunk cable 28 through the first group of bidirectional fiber pairs 36 a in the first landing cable 14 to the BMH 12. However, if the first landing cable 14 were to be damaged, the optical switches in the first EBU 22 could reroute the incoming signal traffic from the bidirectional fiber pairs 32 of the first trunk cable 28 to the first group of bidirectional fiber pairs 36c of the recovery path cable 26, where the traffic could then be transmitted to the BMH 12 via the second EBU 24 and the first group of bidirectional fiber pairs 36 b in the second landing cable 16. Similarly, during normal operation of the architecture 10, the second EBU 24 may route incoming signal traffic from the bidirectional fiber pairs 34 of the second trunk cable 30 through the second group of bidirectional fiber pairs 38 b in the second landing cable 16 to the BMH 12. However, if the second landing cable 16 were to be damaged, the optical switches in the second EBU 24 could reroute the incoming signal traffic from the bidirectional fiber pairs 34 of the second trunk cable 30 to the second group of bidirectional fiber pairs 38 c of the recovery path cable 26, where the traffic could then be transmitted to the BMH 12 via the first EBU 22 and the second group of bidirectional fiber pairs 38 a in the first landing cable 14. In various embodiments, the first and second EBUs 22, 24 may be controlled by telemetry transceivers 40 located in the terrestrial station 20 via the first landing cable 14 and/or the second landing cable 16.

Thus, it will be appreciated that the architecture 10 of the present disclosure facilitates redundant routing of signal traffic between multiple cables and a single landing site for providing enhanced reliability. Additionally, the architecture 10 of the present disclosure provides a further advantage in that it facilitates the connection of additional trunk cables to the BMH 12 in the future (i.e., after initial installation of the architecture 10) without requiring an operator to acquire additional cable landing licenses. For example, during installation of the architecture 10, extra EBUs can be provided in the ring topology of the architecture 10 for accommodating the connection of additional trunk cables at a later time. Alternatively, additional EBUs can be spliced into the ring topology without interrupting signal traffic. For example, referring to the exemplary embodiment of the architecture 10 shown in FIG. 1, incoming signal traffic on the second trunk 30 can be rerouted from the second landing cable 16 to the recovery path cable 26 by the second EBU 24 (as described above), thereby allowing an additional EBU to be spliced to second landing cable 16 without interrupting signal traffic in the architecture 10.

Figure 2A:
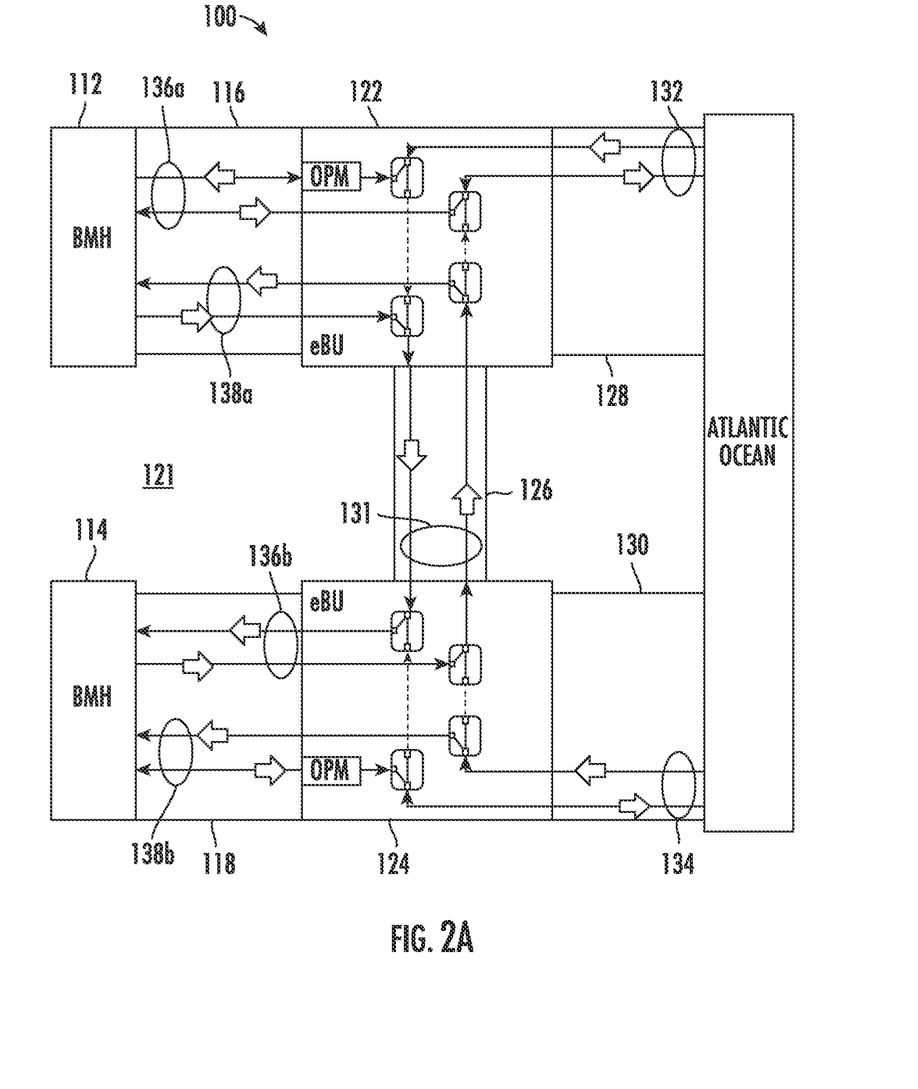
FIG. 2A is a schematic diagram illustrating another exemplary embodiment of an undersea fiber optic cable architecture in accordance with the present disclosure.

Referring to FIG. 2A, another undersea fiber optic cable architecture 100 (hereinafter "the architecture 100") in accordance with an exemplary embodiment of the present disclosure is presented. The architecture 100 may include a first beach manhole (BMH) 112 installed at a first terrestrial site (e.g., along a shoreline) and a second BMH 114 installed at a second terrestrial site. The first and second BMHs 112, 114 may couple undersea fiber optic cables 116, 118 to respective terrestrial fiber optic cables (not shown) extending to respective terrestrial stations (not shown) which may be configured to transmit and receive communication signals via the terrestrial fiber optic cables. The land-based elements of the architecture 100 (i.e., the BMHs 112, 114, the terrestrial fiber optic cables, and the terrestrial stations) may be of conventional construction/configuration familiar to those of ordinary skill in the art and will therefore not be discussed in any greater detail herein.

The undersea fiber optic cables 116, 118 of the architecture 100, hereinafter referred to as "the first and second landing cables 116, 118," may extend from the BMHs 112, 114, respectively, into territorial waters 121 that adjoin the terrestrial sites where the BMHs 112, 114 are located. The first and second landing cables 116, 118 may extend to, and may be coupled to, respective first and second enhanced branching units (EBUs) 122, 124 that are also located within the territorial waters 121 and that are connected to one another by an undersea fiber optic cable 126, hereinafter referred to as "the recovery path cable 126." Thus, the first and second BMHs 112, 114 and the first and second EBUs 122, 124 are interconnected by the first and second landing cables 116, 118 and the recovery path cable 126 to define a ring topology.

Undersea fiber optic cables 128, 130, hereinafter referred to as "the first and second trunk cables 128, 130," may extend from the first and second EBUs 122, 124, respectively, and may extend into international waters for connecting the first and second EBUs 122, 124 to distant terrestrial stations (e.g., terrestrial stations located in different countries and on different continents, not shown). In a non-limiting embodiment of the present disclosure, the recovery path cable 126 and the first and second trunk cables 128, 130 may each include a group of 12 bidirectional fiber pairs 131, 132, 134, and each of the first and second landing cables 116, 118 and may include a first group of 12 bidirectional fiber pairs 136a, 136b, respectively, and a second group of 12 bidirectional fiber pairs 138a, 138b, respectively. Each of the aforementioned groups of bidirectional fiber pairs is represented schematically by a single pair of inbound and outbound lines in FIG. 2A for clarity. The present disclosure is not limited to specific number of bidirectional fiber pairs listed above, and it is contemplated that the first and second trunk cables 128, 130, the first and second landing cables 116, 118, and the recovery path cable 126 may include a greater or fewer number of bidirectional fiber pairs without departing from the present disclosure. Generally, however, the recovery path cable 126 and the first and second trunk cables 128, 130 will include half as many bidirectional fiber pairs as the first and second landing cables 116, 118.

Figure 2B:
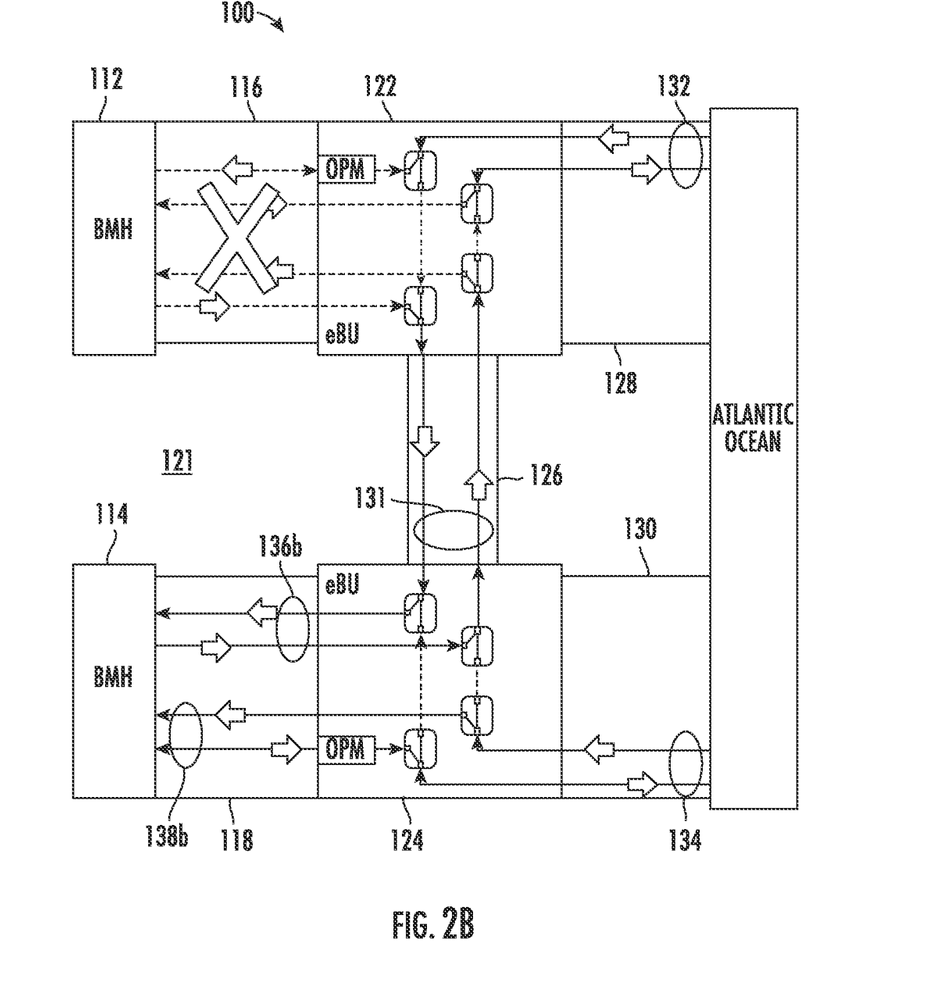
FIG. 2B is a schematic diagram illustrating a fault condition in the undersea fiber optic cable architecture of FIG. 2A.
Figure 2C:
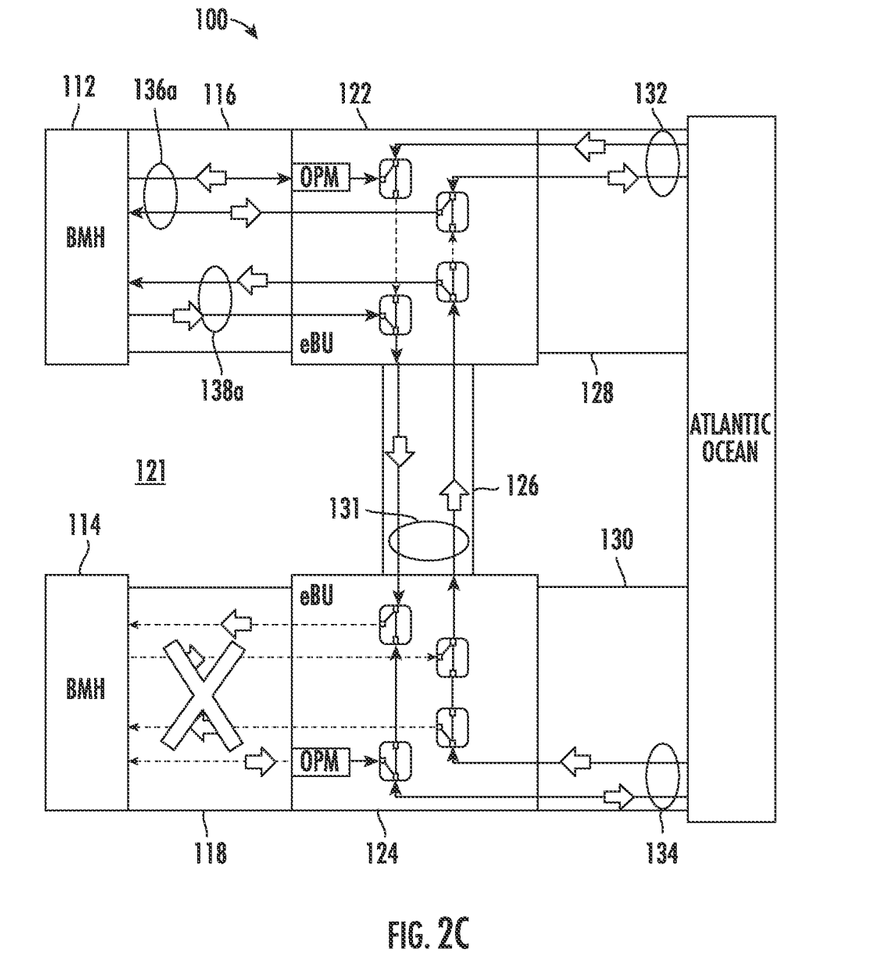
FIG. 2C is a schematic diagram illustrating another fault condition in the undersea fiber optic cable architecture of FIG. 2A.

Each of the first and second EBUs 122, 124 may contain optical switches for selectively routing individual fiber pairs in the respective trunk cables 128, 130 to the respective BMHs 112, 114 through the first and second landing cables 116, 118, or to the BMH 112 or 114 associated with the other EBU 122 or 124 through the recovery path cable 126. For example, during normal operation of the architecture 100, the first EBU 122 may facilitate signal traffic between the bidirectional fiber pairs 132 of the first trunk cable 128 and the first group of bidirectional fiber pairs 136a in the first landing cable 116 to the first BMH 112. Similarly, during normal operation of the architecture 100, the second EBU 124 may facilitate signal traffic between the bidirectional fiber pairs 134 of the second trunk cable 130 and the second group of bidirectional fiber pairs 138b in the second landing cable 118 to the second BMH 114. However, if the first landing cable 116 is disabled (e.g., cut) as shown in FIG. 2B, the optical switches in the first EBU 122 may reroute the signal traffic from the bidirectional fiber pairs 132 of the first trunk cable 128 to the bidirectional fiber pairs 131 of the recovery path cable 126, where the traffic could then be transmitted to the second BMH 114 via the second EBU 124 and the first group of bidirectional fiber pairs 136b in the second landing cable 118. Similarly, if the second landing cable 118 were to be disabled as shown in FIG. 2C, the optical switches in the second EBU 124 could reroute the signal traffic from the bidirectional fiber pairs 134 of the second trunk cable 130 to the bidirectional fiber pairs 131 of the recovery path cable 126, where the traffic could then be transmitted to the first BMH 112 via the first EBU 122 and the second group of bidirectional fiber pairs 138a in the first landing cable 116. In various embodiments, the first and second EBUs 122, 124 may be controlled by telemetry transceivers located in the terrestrial stations (not shown) associated with the first and second BMHs 112, 114 via the first and second landing cables 116, 118 and/or by telemetry transceivers located in terrestrial stations (not shown) associated with BMHs at distant termini of the first and second trunk cables 128, 130.

Thus, it will be appreciated that the architecture 100 of the present disclosure allows signal traffic on multiple trunk cables to be maintained even if a landing cable of the architecture is disabled.

Figure 3:
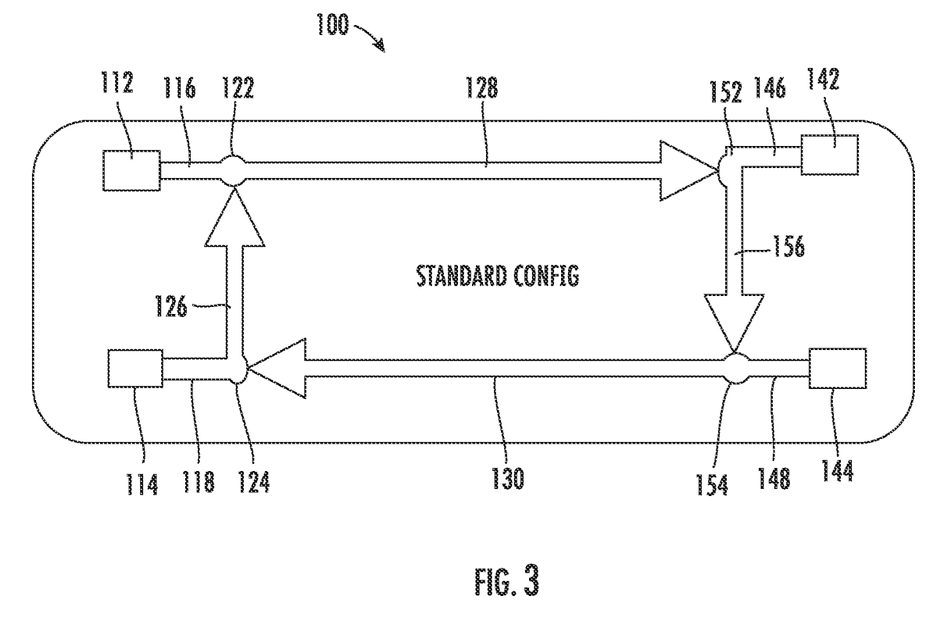
FIG. 3 is a schematic diagram illustrating electrical power distribution in the undersea fiber optic cable architecture of FIG. 2A.

Referring now to FIG. 3, a schematic diagram illustrating electrical power distribution in the above-described architecture 100 is shown. In addition to the components of the architecture 100 shown in FIGS. 2A-2C, FIG. 3 includes components located at the distal ends of the trunk cable 128, 130 relative to the first and second BMHs 112, 114. These components include third and fourth BMHs 142, 144 located at respective terrestrial sites (e.g., along a shoreline), third and fourth landing cables 146, 148 extending from the BMHs 142, 144, respectively, third and fourth EBUs 152, 154 connecting the third and fourth landing cables 146, 148 to the first and second trunk cables 128, 130, and a recovery cable 156 connecting the first and second EBUs 152, 154 to one another. These components may be configured in substantially the same manner as the components of the architecture described above and shown in FIGS. 2A-2C.

During normal operation of the architecture 100, and as indicated by the arrowed lines shown in FIG. 3, power feed equipment (PFE) associated with the first BMH 112 may supply power through the first landing cable 116 and the first trunk cable 128; PFE associated with the second BMH 114 may supply power through the second landing cable 118 and the recovery cable 126; PFE associated with the third BMH 142 may supply power through the third landing cable 146 and the recovery cable 156; and PFE associated with the fourth BMH 144 may supply power through the fourth landing cable 148 and the second trunk cable 130. However, if there is a fault (e.g., a shunt faults, a cable cut, etc.) in any of the cables, the EBUs 112, 114, 152, 154 may be configured to redirect the flow of electrical power to undamaged cables. Various non-limiting examples of fault conditions and corresponding rerouting of electrical power in the architecture 100 will now be described.

In the case of a shunt fault in the recovery cable 126, power feed equipment (PFE) associated with the first BMH 112 may supply power through the first landing cable 116, the first trunk cable 128, and the third landing cable 146; PFE associated with the second BMH 114 may supply power through the second landing cable 118 and the second trunk cable 130; and PFE associated with the fourth BMH 144 may supply power through the fourth landing cable 148 and the recovery cable 156.

In the case of a shunt fault in the recovery cable 156, power feed equipment (PFE) associated with the first BMH 112 may supply power through the first landing cable 116, the first trunk cable 128, and the third landing cable 146; PFE associated with the second BMH 114 may supply power through the second landing cable 118 and the recovery cable 126; and PFE associated with the fourth BMH 144 may supply power through the fourth landing cable 148 and the second trunk cable 130.

In the case of a shunt fault in the recovery cable 126 and a cable cut in the second landing cable 118, power feed equipment (PFE) associated with the first BMH 112 may supply power through the first landing cable 116, the first trunk cable 128, and the third landing cable 146; and PFE associated with the fourth BMH 144 may supply power through the fourth landing cable 148 and the recovery cable 156.

In the case of a shunt fault in the recovery cable 126 and a cable cut in the fourth landing cable 148, power feed equipment (PFE) associated with the first BMH 112 may supply power through the first landing cable 116, the first trunk cable 128, and the third landing cable 146; and PFE associated with the second BMH 114 may supply power through the second landing cable 118, the second trunk cable 130, and the recovery cable 156.

In the case of a shunt fault in the recovery cable 126 and a cable cut in the third landing cable 146, power feed equipment (PFE) associated with the first BMH 112 may supply power through the first landing cable 116, the first trunk cable 128, the recovery path cable 156, and the fourth landing cable 148; and PFE associated with the second BMH 114 may supply power through the second landing cable 118 and the second trunk cable 130.

In the case of a cable cut in the first trunk cable 128, power feed equipment (PFE) associated with the first BMH 112 may supply power through the first landing cable 116 and the recover path cable 126; PFE associated with the second BMH 114 may supply power through the second landing cable 118 and the second trunk cable 130; and PFE associated with the fourth BMH 144 may supply power through the fourth landing cable 148 and the recovery cable 156.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

What is claimed is:

1. An undersea fiber optic cable architecture, comprising:
    a beach manhole (BMH) installed at a terrestrial site, the BMH is communicatively coupled, by a terrestrial fiber optic cable, to a terrestrial station including one or more telemetry transceivers, the BMH including a power feed equipment;
    a first enhanced branching unit (EBU) located in territorial waters adjacent to the terrestrial site;
    a second EBU located in the territorial waters adjacent to the terrestrial site;
    a first landing cable extending from the BMH and connected to the first EBU, the one or more telemetry transceivers controlling the first EBU via the first landing cable;
    a second landing cable extending from the BMH and connected to the second EBU, the one or more telemetry transceivers controlling the second EBU via the second landing cable;
    a recovery path cable connecting the first EBU to the second EBU, the first EBU, the second EBU, the first landing cable, and the second landing cable being disposed in a first underwater location;
    a first trunk cable extending from the first EBU into international waters being separate from and extending away from the first underwater location; and
    a second trunk cable extending from the second EBU into the international waters;
    the power feed equipment, in the BMH, routing power along one or more routes defined by at least one combination of: the first and second EBUs, the first and second landing cables, and the first and second trunk cables, based on a determination of at least one of: a failure in the recovery path cable, one or more cuts in at least one of the first and second landing cables, and one or more cuts in at least one of the first and second trunk cables.

2. The undersea fiber optic cable architecture of claim 1, wherein the first EBU includes one or more optical switches for selectively routing signal traffic on the first trunk cable to the first landing cable or the recovery path cable.

3. The undersea fiber optic cable architecture of claim 1, wherein the second EBU includes one or more optical switches for selectively routing signal traffic on the second trunk cable to the second landing cable or the recovery path cable.

4. The undersea fiber optic cable architecture of claim 1, wherein the BMH, the first EBU, and the second EBU being interconnected by the first and second landing cables and the recovery path cable define a ring topology.

5. The undersea fiber optic cable architecture of claim 4, wherein each of the first and second landing cables and the recovery path cable include a first group of eight bidirectional fiber pairs and a second group of eight bidirectional fiber pairs, and
    wherein the ring topology includes a total of sixteen bidirectional fiber pairs.

6. The undersea fiber optic cable architecture of claim 4, wherein the ring topology is configured to accommodate one or more additional EBUs for connecting additional trunk cables.

7. The undersea fiber optic cable architecture of claim 4, wherein one or more additional EBUs is configured to be spliced into the ring topology without interrupting signal traffic.

8. An undersea fiber optic cable architecture comprising:
    a first beach manhole (BMH) installed at a first terrestrial site, the first BMH including a first power feed equipment;
    a second BMH installed at the first terrestrial site, the second BMH including a second power feed equipment;
    at least one of the first and second BMH are communicatively coupled, by one or more terrestrial fiber optic cables, to one or more terrestrial station including one or more telemetry transceivers;
    a first landing cable extending from the first BMH into territorial waters adjacent to the terrestrial site and connected to a first enhanced branching unit (EBU) located in the territorial waters, the one or more telemetry transceivers controlling the first EBU via the first landing cable;
    a second landing cable extending from the second BMH into the territorial waters adjacent to the terrestrial site and connected to a second EBU located in the territorial waters, the one or more telemetry transceivers controlling the second EBU via the second landing cable;
    a recovery path cable connecting the first EBU to the second EBU, the first landing cable, and the second landing cable being disposed in the territorial waters;
    a first trunk cable extending from the first EBU into international waters being separate from and extending away from the territorial waters; and
    a second trunk cable extending from the second EBU into the international waters;
    at least one of the first and second power feed equipment, in the respective first BMH and the second BMH, routing power along one or more routes defined by at least one combination of: the first and second EBUs, the first and second landing cables, and the first and second trunk cables, based on a determination of at least one of: a failure in the recovery path cable, one or more cuts in at least one of the first and second landing cables, and one or more cuts in at least one of the first and second trunk cables.

9. The undersea fiber optic cable architecture of claim 8, wherein the first EBU includes one or more optical switches for selectively routing incoming signal traffic on the first trunk cable to the first landing cable or the recovery path cable.

10. The undersea fiber optic cable architecture of claim 8, wherein the second EBU includes one or more optical switches for selectively routing incoming signal traffic on the second trunk cable to the second landing cable or the recovery path cable.

11. The undersea fiber optic cable architecture of claim 8, wherein the first BMH, the second BMH, the first EBU, and the second EBU being interconnected by the first and second landing cables and the recovery path cable define a ring topology.

12. The undersea fiber optic cable architecture of claim 11, wherein the ring topology is configured to accommodate one or more additional EBUs for connecting additional trunk cables.

13. The undersea fiber optic cable architecture of claim 11, wherein one or more additional EBUs is configured to be spliced into the ring topology without interrupting signal traffic.

14. The undersea fiber optic cable architecture of claim 8, wherein each of the first and second landing cables include a first group of twelve bidirectional fiber pairs and a second group of twelve bidirectional fiber pairs.

15. The undersea fiber optic cable architecture of claim 8, wherein the first and second EBUs are controlled by one or more telemetry transceivers located in terrestrial stations associated with one or more BMHs at distant termini of the first and second trunk cables.

* * * * *